(12) United States Patent
Daniel et al.

(10) Patent No.: US 9,562,564 B2
(45) Date of Patent: Feb. 7, 2017

(54) GUIDE CARRIAGE OF A LINEAR GUIDE

(71) Applicant: Schaeffler Technologies AG & Co. KG, Herzogenaurach (DE)

(72) Inventors: Patrick Daniel, Kirkel (DE); Dietmar Rudy, Kleinbundenbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/893,294

(22) PCT Filed: Mar. 3, 2014

(86) PCT No.: PCT/DE2014/200101
§ 371 (c)(1),
(2) Date: Nov. 23, 2015

(87) PCT Pub. No.: WO2014/187454
PCT Pub. Date: Nov. 27, 2014

(65) Prior Publication Data
US 2016/0123386 A1 May 5, 2016

(30) Foreign Application Priority Data
May 21, 2013 (DE) ........................ 10 2013 209 294

(51) Int. Cl.
| | | |
|---|---|---|
| *F16C 29/08* | (2006.01) | |
| *F16C 29/06* | (2006.01) | |
| *B29D 99/00* | (2010.01) | |
| *B29K 21/00* | (2006.01) | |

(52) U.S. Cl.
CPC .......... *F16C 29/088* (2013.01); *B29D 99/0053* (2013.01); *F16C 29/0645* (2013.01); *B29K 2021/003* (2013.01)

(58) Field of Classification Search
CPC ..................................................... F16C 29/088
See application file for complete search history.

(56) References Cited

U.S. PATENT DOCUMENTS 5,087,130 A * 2/1992 Tsukada ................ F16C 29/088
384/15
5,149,205 A * 9/1992 Tsukada ................ F16C 29/088
384/15

(Continued)

FOREIGN PATENT DOCUMENTS

| DE | 102007056857 | 5/2009 |
| DE | 102009052318 | 5/2011 |
| JP | H398320 | 10/1991 |

*Primary Examiner* — Thomas R. Hannon
(74) *Attorney, Agent, or Firm* — Volpe and Koenig, P.C.

(57) ABSTRACT

A guide carriage of a linear guide, which guide carriage has a back (1) and legs (2) bent away from the back (1) and disposed along a longitudinal axis of the guide carriage for engaging over a guide rail (7), the two legs (2) are each provided with a longitudinal seal (5) having rod-shaped bodies (12) each of which has a sealing lip (8) on sides facing one another. The rod-shaped body (12) is supported on an abutment (9*a*) of the leg (2) provided along the longitudinal axis, wherein the rod-shaped body (12) is retained on the guide carriage together with the two axial rod ends (13, 15, 18) of the rod-shaped body (12) and is spring-loaded against the abutment (9*a*) by means of the inherent spring force of the rod-shaped body (12).

7 Claims, 5 Drawing Sheets

(56) References Cited

U.S. PATENT DOCUMENTS

| | | | | |
|---|---|---|---|---|
| 5,342,127 A | * | 8/1994 | Agari | F16C 29/088 384/15 |
| 5,358,336 A | * | 10/1994 | Agari | F16C 29/088 384/15 |
| 5,360,271 A | * | 11/1994 | Agari | F16C 29/088 384/15 |
| 5,362,155 A | * | 11/1994 | Ichida | F16C 29/088 384/15 |
| 5,374,127 A | * | 12/1994 | Agari | F16C 29/088 384/15 |
| 5,451,109 A | | 9/1995 | Ichida | |
| 5,553,944 A | * | 9/1996 | Osawa | F16C 29/088 384/15 |
| 7,380,988 B1 | * | 6/2008 | Chen | F16C 29/065 384/15 |
| 7,578,619 B2 | * | 8/2009 | Nakagawa | F16C 29/088 384/15 |
| 8,206,036 B2 | * | 6/2012 | Kuwabara | F16C 29/065 384/15 |
| 2009/0310892 A1 | | 12/2009 | Chen et al. | |

\* cited by examiner

GUIDE CARRIAGE OF A LINEAR GUIDE

BACKGROUND

The present invention relates to a guide carriage of a linear guide. Such guide carriages can be placed on a guide rail and displaced along a rail axis.

From DE102007056857A1, for example, a prior art guide carriage according to the features of the invention is known. FIGS. 2, 2*a* show a cross section through a linear guide with a guide carriage that is arranged so that it can be displaced longitudinally on a guide rail. A longitudinal seal 37 is held in a supporting groove designated as an alignment groove. This supporting groove is formed on the free end of a leg of the guide carriage parallel to the longitudinal axis of the guide carriage.

From US 2009/0310892 A1, a guide carriage of a linear guide has become known whose longitudinal seal is inserted into pockets of the carrier body over its axial extent.

From U.S. Pat. No. 5,451,109 A, a guide carriage of a linear guide has become known whose longitudinal seal is provided on its two axial ends with hooks that are held on the leg of the carrier body.

From DE 10 2009 052 318 A1, a guide carriage of a linear guide has become known whose longitudinal seal is inserted into pockets of the carrier body with an undercut over its axial extent.

SUMMARY

The objective of the present invention is to provide a guide carriage in which the longitudinal seal is held on the guide carriage without any problem.

This object is achieved by the guide carriage with one or more features of the invention. The guide carriage according to the invention has a back side and legs that are angled away from the back side and are arranged along a longitudinal axis of the guide carriage for gripping around a guide rail. Both legs are each provided with a longitudinal seal whose rod-shaped bodies have a sealing lip on each of the sides facing each other. In the sense of the invention, "rod-shaped" designates a body that is elongated along an axis. When the guide carriage is placed on a guide rail, the sealing lips contact the guide rail and form a sealing contact with it. The rod-shaped body is supported on an abutment of the leg provided along the longitudinal axis. This means that the longitudinal seal is supported without any problem over its axial extent from one end up to the other end and a sufficient contact pressure of the sealing lip is given when the guide carriage is arranged on the guide rail. According to the invention, the rod-shaped body of the longitudinal seal is held with its two axial rod ends on the guide carriage and is spring-loaded with its internal spring force against the abutment.

This arrangement reliably prevents the longitudinal seal from sagging. This spring force acts perpendicular to the longitudinal direction of the longitudinal seal. The spring force acts in the straight longitudinal seal. This causes the longitudinal seal to be curved such that its ends are not on a common straight line. If the longitudinal seal is now bent straight, this bending takes place in a spring elastic way and a spring force is generated in the rod-shaped body of the longitudinal seal so that the longitudinal seal that is bent straight exerts a spring force perpendicular to its longitudinal direction on the abutment with the section of the rod-shaped body between the rod ends. It is not necessary to hold the longitudinal seal in its axial center with additional means on the guide carriage. The axis in which the spring force acts on the abutment and the axis in which a contact pressure force of the sealing lips is supported on the abutment—when the guide carriage is displaced on the guide rail—are preferably both at an angle to each other.

Advantageously, the guide carriage has a carrier body and head pieces arranged on both ends of the carrier body set in the direction of the longitudinal axis, wherein the longitudinal seal is held with its two axial ends on the head pieces. Such guide carriages are often provided with endless roller body circuits, wherein there are, in the head pieces, so-called roller body baffles that deflect the roller bodies from a return channel into a load channel of the guide carriage. These head pieces can be preferably provided, for example, with pockets in which the rod ends of the rod-shaped body engage. The pockets can lie on a common straight axis.

Advantageously, the sealing lip and the rod-shaped body are connected to each other integrally, wherein both axial rod ends of the rod-shaped body are free from the sealing lip. These two rod ends can then be inserted, for example, into the mentioned pockets of the head pieces.

The carrier body of the guide carriage can be provided on its two legs with a supporting groove formed along the longitudinal axis for holding the rod-shaped body. This supporting groove then forms the contact for the rod-shaped body. The supporting groove has two supporting surfaces that are arranged at an angle to each other and are extended along the longitudinal axis and on which the rod-shaped body is supported. The first supporting surfaces of the two supporting grooves are directed toward the bottom side of the guide carriage; the two other supporting surfaces face each other. The facing supporting surfaces are used for problem-free supporting of the longitudinal seal perpendicular to its longitudinal axis, so that the sealing lip comes into contact with the guide carriage in the intended way. The longitudinal seal is spring-loaded with its rod-shaped body elastically against the supporting surfaces of the supporting grooves directed toward the bottom side of the guide carriage, so that sagging of the longitudinal seal, especially in its axial middle, is avoided.

The insertion of the longitudinal seal into the guide carriage according to the invention favorably takes place according to the following method: the longitudinal seal detached from the guide carriage is first curved into an arc shape, without this shaping producing a spring force internally.

When the arc-shaped curvature is retracted—i.e., the rod-shaped body deflects from the arc-shaped curvature toward a straight axis—the two rod ends can be held on the guide carriage, wherein, due to the straight bend of the rod-shaped body, this straightens out when a spring force is applied, so that the rod-shaped body is against the abutment with its internal spring force.

This abutment can be formed—as already mentioned—by the supporting groove, wherein then the rod-shaped body is spring-loaded against the first supporting surfaces of the two supporting grooves. For assembly, first the one rod end of the rod-shaped body can be inserted into a pocket of the guide carriage, then the rod-shaped body can be bent so that the opposing rod end is inserted into the opposing pocket of the guide carriage. In this position, the rod-shaped body is deformed elastically such that its section carrying the sealing lip is spring-loaded against the first supporting surfaces of the supporting groove, so that the longitudinal seal does not sag. The longitudinal seal bent straight in this way is also tailored for problem-free contact with the guide rail.

A longitudinal seal according to the invention can be produced according to the following method: the rod-shaped body can be produced by injection molding with the integrally formed sealing lip along an arc-shaped, curved rod axis, wherein the rod ends of the rod-shaped body are injection molded along a straight axis. After completion of the injection molding, the arc-shaped, curved rod body can be bent in the direction toward a straight rod axis under elastic shape changes to the rod body.

Such longitudinal seals or rod-shaped bodies can be favorably made from a thermoplastic elastomer.

BRIEF DESCRIPTION OF THE DRAWINGS

The invention will be explained in more detail below with reference to three embodiments shown in a total of eleven figures. Shown are.

DETAILED DESCRIPTION OF THE PREFERRED EMBODIMENTS

Figure 1:
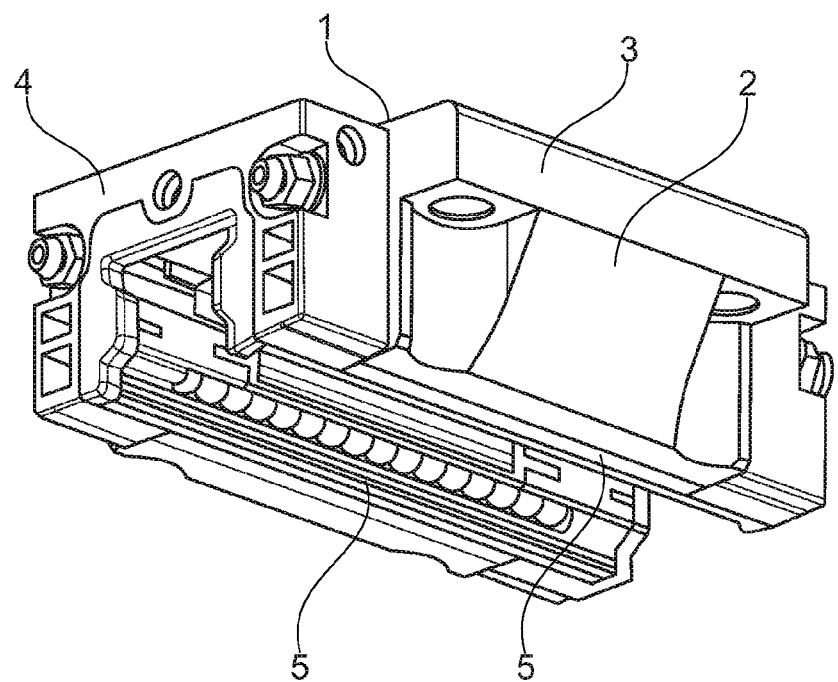
FIG. 1 a guide carriage according to the invention in perspective view.

FIG. 1 shows the guide carriage according to the invention in perspective view. The guide carriage has a back side 1 and legs 2 that are angled away from the back side 1 and arranged along a longitudinal axis of the guide carriage for gripping around a not-shown guide rail. The guide carriage has a carrier body 3 and head pieces 4 arranged on two ends of the carrier body 3 set in the direction of the longitudinal axis. Both legs 2 are provided on their free ends with a longitudinal seal 5 that forms a sealing contact on the not-shown guide rail.

Figure 2:
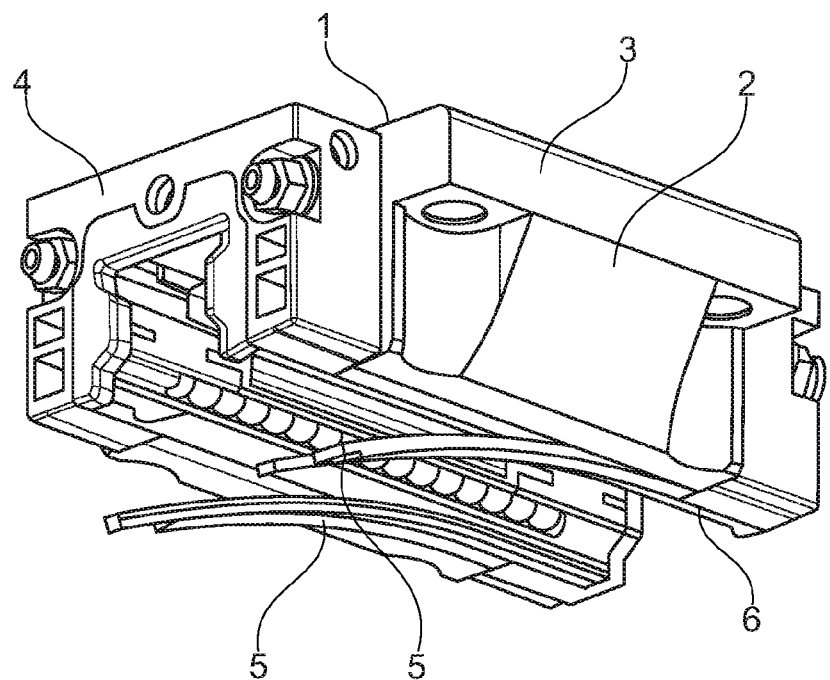
FIG. 2 an assembly step for producing the guide carriage according to FIG. 1.

FIG. 2 clearly shows the longitudinal seals 5 that engage with their one end in pockets 6 of the head piece 4 not shown in more detail. The ends of the longitudinal seal 5 detached from the guide carriage in FIG. 2 can be inserted under elastic bending of the longitudinal seal 5 into the corresponding pockets 6 of the opposing head piece 4, wherein, in this installed situation, the longitudinal seal 5 is elastically pretensioned and supported elastically on the carrier body 3.

Figure 3:
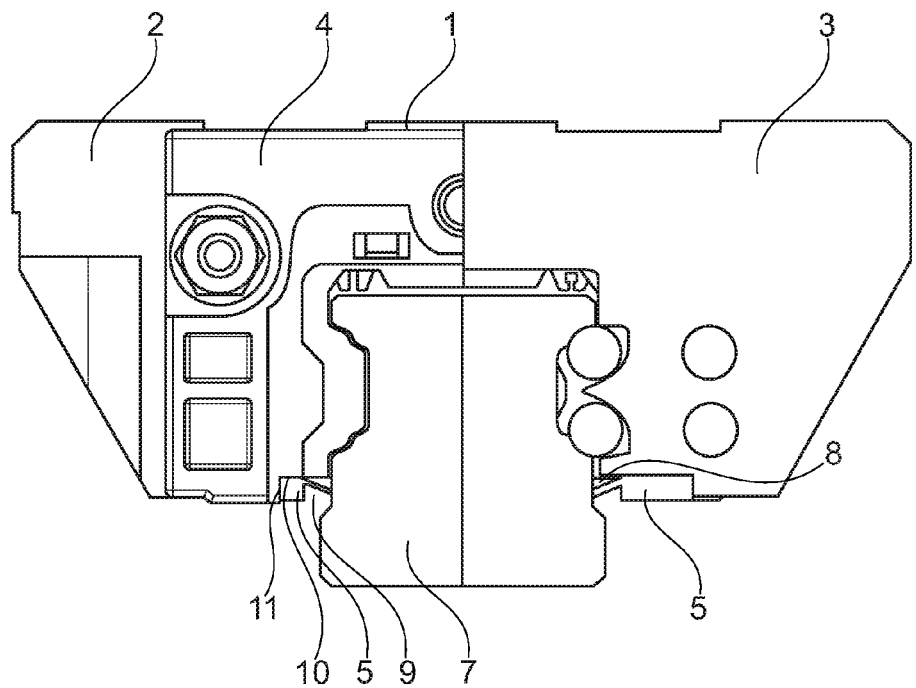
FIG. 3 a cross section through the guide carriage according to the invention according to FIG. 1, FIG. 4 the longitudinal seal of the guide carriage according to the invention according to FIG. 1 as an individual part in a first view, FIG. 5 the longitudinal seal from FIG. 4 in another view, FIG. 6 the guide carriage as in FIG. 2, shown in a side view, FIG. 7 a cross section through the guide carriage according to the invention according to FIG. 1 in the area of the head piece, FIG. 8 a cut-out of a variant according to the invention in a section as in FIG. 7, FIG. 9 another variant according to the invention, FIG. 10 an injection molding tool for producing a longitudinal seal according to the invention, and FIG. 11 the arc-shaped, curved and then straightened longitudinal seal.

FIG. 3 shows a cross section through a linear guide with the guide carriage according to the invention from FIG. 1. In this figure, a guide rail 7 is shown that is wrapped around by the guide carriage, wherein the longitudinal seal forms a sealing contact on the guide rail 7 with its sealing lip 8.

From this figure it can be clearly seen that both legs 2 are provided on their free ends with a supporting groove 9 that extends over the entire length of the carrier body 3. The supporting grooves 9 formed on both legs 2 have supporting surfaces 10, 11 that are arranged at an angle to each other and are extended along the longitudinal axis and on which the longitudinal seal 5 is supported. The first supporting surfaces 10 are directed downward in the figure—toward the bottom side of the carriage—the two other supporting surfaces 11 face each other.

Figure 4:
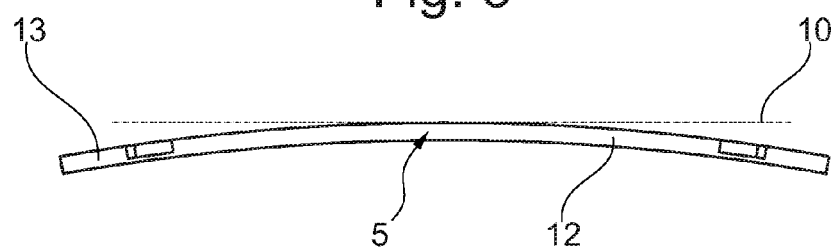
Figure 5:
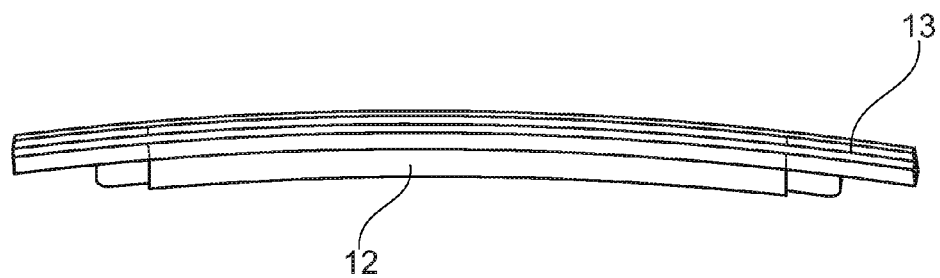

FIGS. 4 and 5 show the longitudinal seal 5 that has a rod-shaped body 12 with the sealing lip 13 formed integrally on the rod-shaped body 12. FIG. 4 clearly shows that the longitudinal seal 5 is curved in an arc shape when the longitudinal seal 5 is removed from the guide carriage. The two rod ends 13 are straight and attach tangentially to the arc-shaped axis of the arc-shaped, curved rod-shaped body 12. These straight rod ends 13 engage in the pockets 6 of the guide carriage formed in the head pieces 4.

In FIG. 4, the supporting surface 10 of the supporting groove 9 is shown with dashed lines, against which the longitudinal seal is applied with its rod-shaped body 12. In this figure, the longitudinal seal 5 is curved in an arc shape and unloaded. In the installed state, the longitudinal seal 5 is in the plane of the supporting surface 10, wherein the longitudinal seal is deflected from the arc-shaped curvature into the plane under elastic deformation of the longitudinal seal 5. In FIG. 4, if the two rod ends 13 of the rod-shaped body 12 are arranged in the plane of the supporting surface 10, the longitudinal seal 5 exerts a pressure against the supporting surface 10 of the supporting groove 9 with its internal spring force. In this way, downward sagging of the longitudinal seal is reliably prevented.

Figure 6:
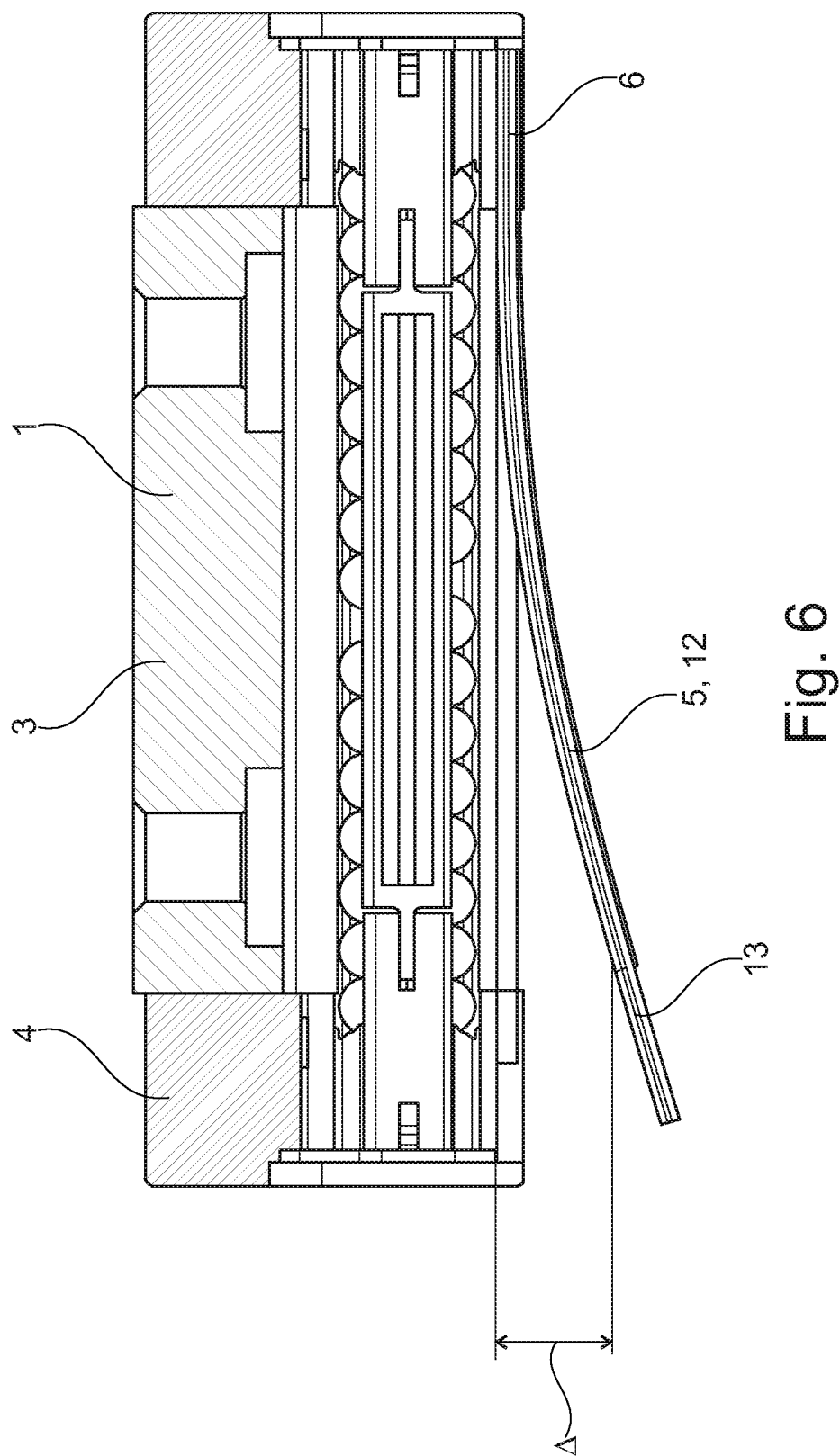

FIG. 6 shows the guide carriage as in FIG. 2, but not in a perspective view, but in a view wherein the arc-shaped, curved section of the rod-shaped body 12 is bent from here toward the free end by the spring path S in the direction toward the guide carriage.

Figure 7:
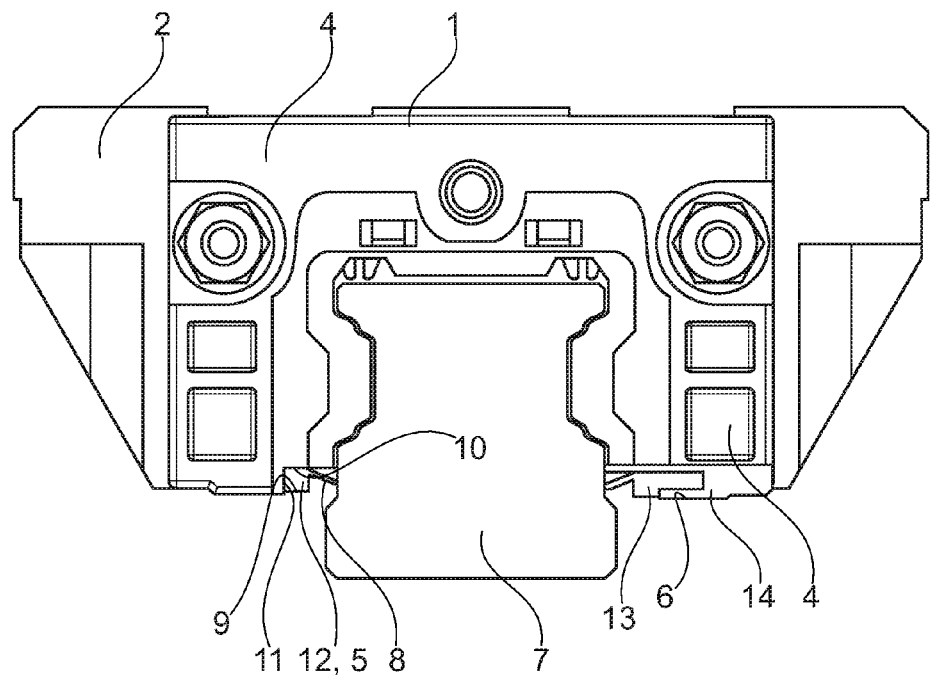

FIG. 7 clearly shows the pocket 6 formed in the head piece 4 for holding the rod end 13 of the rod-shaped body 12. This pocket 6 is formed on an insert part 14 that is fastened to the head piece 4. It can be seen in this figure that the rod end 13 is inserted into this pocket 6 perpendicular to the longitudinal axis of the guide carriage.

Figure 8:
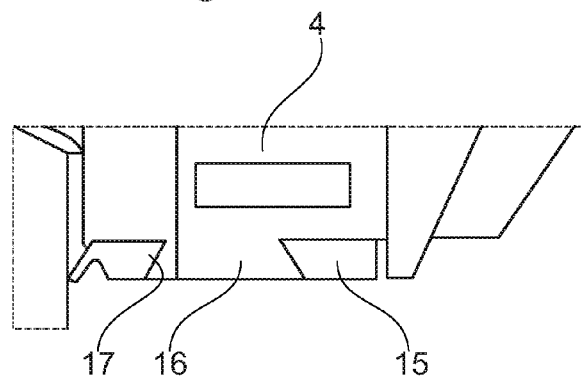

FIG. 8 shows, in a cut-out enlargement, a variant with a modified rod end 15 of the rod-shaped body 12. On the head piece 4 there is a conical head 16. On the rod end 15 there is a corresponding conical hole 17. The conical head engages behind the conical hole 17 when the rod end 15 is mounted.

Figure 9:
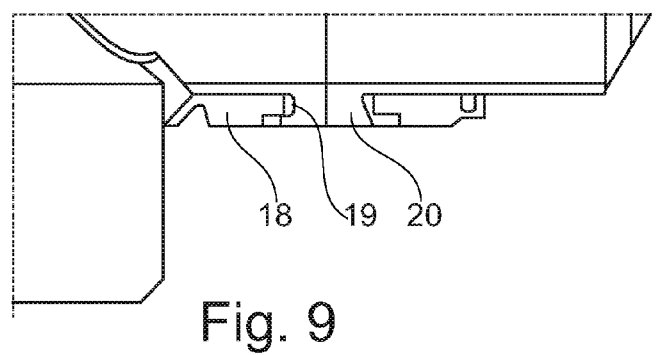

FIG. 9 shows another alternative construction of a rod end 18 that is provided with an opening 19 in which a two-part tenon projection 20 engages. The tenon projection 20 is fastened to the head piece and provides for a problem-free fixing of the rod end 18 on the guide carriage.

Figure 10:
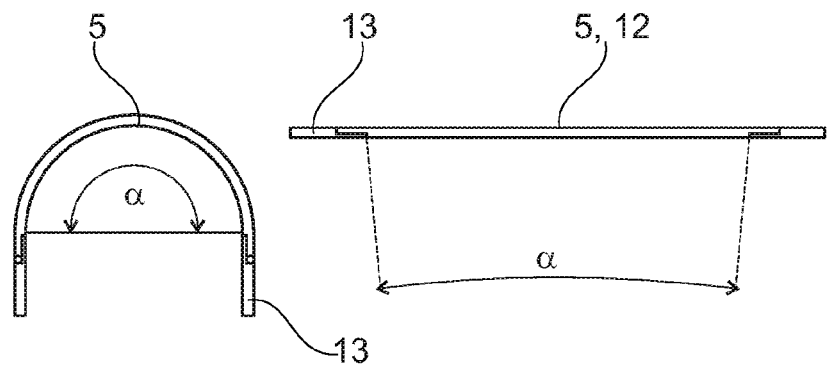

FIG. 10 shows the longitudinal seal 5 with its rod-shaped body 12 and the rod ends 13 freed from the sealing lips in an unloaded position in which the longitudinal seal 5 is bent by approximately 180 degrees, so that its two rod ends 13 point in a common direction. Next to it on the right, the loaded longitudinal seal 5 can be seen in which the rod-shaped body 12 is bent into a plane. In this loaded situation, the longitudinal seal 5 develops an internal spring force that supports a pressing of the rod-shaped body against the guide carriage.

For all of the guide carriages according to the invention, the ends of the longitudinal seals according to the invention are supported without a problem on the head piece. The arc-shaped curvature of the longitudinal seal 5 should be a single, continuous curve. The straight shape of the rod ends of the rod-shaped body of the longitudinal seal simplifies the fastening to the head pieces of the guide carriage. Depending on the selected material for the longitudinal seal and the desired spring force that should develop internally in the longitudinal seal in the installed state, the angle of curvature a is selected. From a tool perspective, it is expedient to select no angle of curvature greater than 180 degrees. For angles α≤180 degrees, the seal can be produced with a simple injection molding tool.

Figure 11:
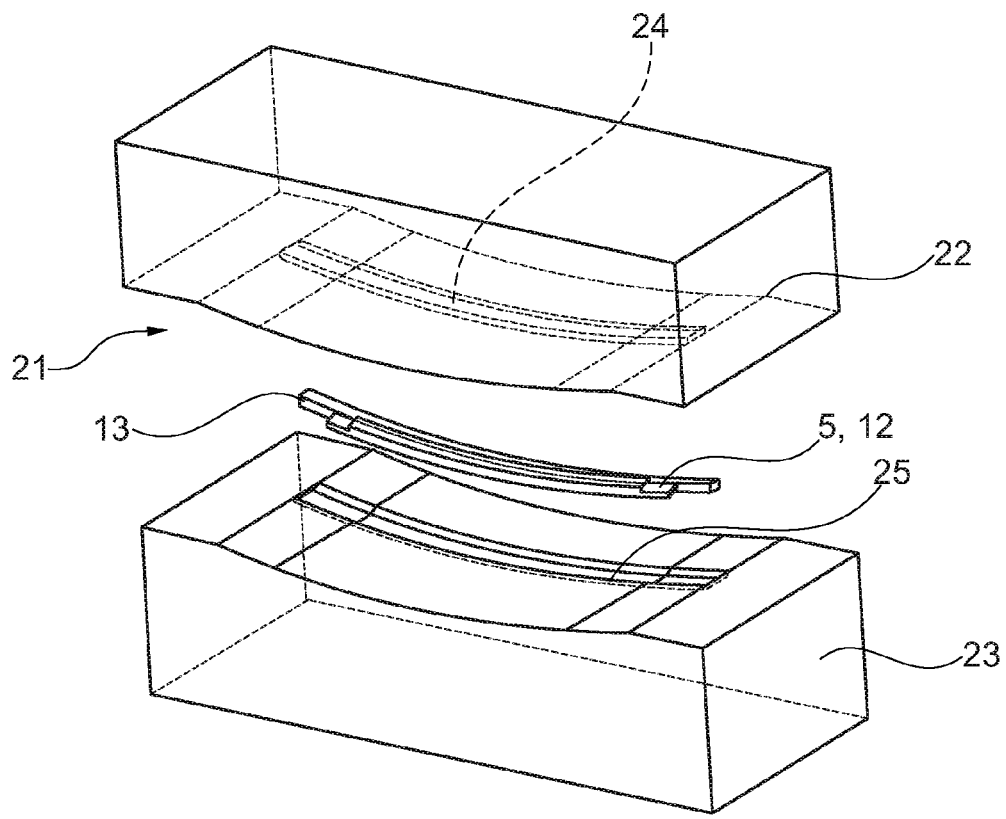

FIG. 11 shows an injection molding tool 21 that has an upper tool half 22 and a lower tool half 23. On its facing sides, the two tool halves 22, 23 are each provided with a die half 24, 25 for the longitudinal seal. The two die halves 24, 25 both extend along a curved axis. FIG. 11 shows the situation after injection molding of the two die halves 24, 25 and opening the injection molding tool 21 with the finished, injection-molded longitudinal seal 5. It can be clearly seen that the longitudinal seal 5 is curved in an arc shape between its two rod ends 13 due to the shape of the injection molding tool 21.

LIST OF REFERENCE NUMBERS

1 Back side
2 Leg
3 Carrier body
4 Head piece
5 Longitudinal seal
6 Pocket
7 Guide rail
8 Sealing lip
9 Supporting groove
9*a* Abutment
10 Supporting surface
11 Supporting surface
12 Rod-shaped body
13 Rod end
14 Insert part
15 Rod end
16 Conical head
17 Conical hole
18 Rod end
19 Opening
20 Tenon projection
21 Injection molding tool
22 Upper tool half
23 Lower tool half
24 Die half
25 Die half

The invention claimed is:

1. A guide carriage of a linear guide, said guide comprising a back side and two legs that are angled away from the back side and arranged along a longitudinal axis of the guide carriage for gripping around a guide rail, the two legs are each provided with a longitudinal seal having rod-shaped bodies which each have a sealing lip on sides facing each other, the rod-shaped bodies are each supported on an abutment of the leg provided along the longitudinal axis, and each of the rod-shaped bodies is held with two axial rod ends thereof on the guide carriage and is spring-loaded with an internal spring force against the abutment, wherein the rod-shaped bodies are formed to have an arc-shape when no external forces are applied.

2. The guide carriage according to claim 1, further comprising a carrier body and head pieces arranged on both ends of the carrier body set in a direction of the longitudinal axis, and each of the longitudinal seals is held with the two axial rod ends thereof on the head pieces.

3. The guide carriage according to claim 2, wherein each of the sealing lips is integrally connected to a corresponding one of the rod-shaped bodies, and both of the axial rod ends of each of the rod-shaped bodies are free from the sealing lip.

4. The guide carriage according to claim 2, wherein the carrier body includes the two legs, and a supporting groove is formed along the longitudinal axis for holding the rod-shaped body on each of the two legs, the supporting groove is provided with first and second supporting surfaces that are arranged at an angle to each other and are extended along the longitudinal axis and on which the rod-shaped body is supported, and the first supporting surfaces of the two bearing grooves are directed toward a bottom side of the guide carriage and the second supporting surfaces face each other.

5. A method for producing a longitudinal seal for a guide carriage according to claim 1, in which the rod-shaped bodies are each provided with a sealing lip arranged along the longitudinal axis, the method comprises: injection molding of the rod-shaped body with the sealing lip being integrally formed along an arched, curved rod axis, with rod ends of the rod-shaped body being injection molded along a straight axis, and the arched, curved rod body produced is bent in a direction toward a straight rod axis under elastic shape changes to the rod body.

6. The method according to claim 5, wherein the longitudinal seal is made from a thermoplastic elastomer.

7. The guide carriage according to claim 1, wherein an entire length of the rod-shaped body is planar when the longitudinal seal is held with the two axial rod ends thereof on the guide carriage.

* * * * *